United States Patent
Foster

(12) 
(10) Patent No.: US 12,247,865 B1
(45) Date of Patent: Mar. 11, 2025

(54) PORTABLE LUGGAGE SCALE

(71) Applicant: Hope Foster, Coral Springs, FL (US)

(72) Inventor: Hope Foster, Coral Springs, FL (US)

( * ) Notice: Subject to any disclaimer, the term of this patent is extended or adjusted under 35 U.S.C. 154(b) by 344 days.

(21) Appl. No.: 17/846,841

(22) Filed: Jun. 22, 2022

(51) Int. Cl.
| | |
|---|---|
| *G01G 21/28* | (2006.01) |
| *A45C 5/03* | (2006.01) |
| *G01G 19/00* | (2006.01) |
| *G01G 19/52* | (2006.01) |
| *G01G 23/16* | (2006.01) |
| *A45C 13/00* | (2006.01) |

(52) U.S. Cl.
CPC ........... *G01G 21/283* (2013.01); *G01G 19/00* (2013.01); *G01G 19/52* (2013.01); *G01G 23/16* (2013.01); *A45C 5/03* (2013.01); *A45C 13/001* (2013.01); *A45C 2200/00* (2013.01)

(58) Field of Classification Search
CPC ........ G01G 19/52; G01G 19/58; G01G 21/28; G01G 21/283; G01G 19/00; G01G 23/16; A45C 5/03; A45C 13/001; A45C 2200/00
See application file for complete search history.

(56) References Cited

U.S. PATENT DOCUMENTS

| | | | | |
|---|---|---|---|---|
| 4,030,559 A | * | 6/1977 | Fish ...................... | G01G 23/20 177/264 |
| 4,696,360 A | * | 9/1987 | Homen .................. | G01G 19/52 177/1 |
| 7,151,231 B2 | * | 12/2006 | Kamakau ............... | A45C 15/00 177/245 |
| 7,161,097 B1 | * | 1/2007 | Gorgone ................ | G01G 19/58 177/245 |
| 7,629,542 B1 | | 12/2009 | Harding et al. | |
| 7,692,107 B1 | * | 4/2010 | Shotey ................... | G01G 19/58 177/245 |
| 10,139,211 B1 | * | 11/2018 | Tillinghast ............ | G01G 19/64 |
| 10,670,451 B2 | * | 6/2020 | Dixon, Jr. ............. | B65D 79/00 |
| 2011/0100726 A1 | | 5/2011 | Wu et al. | |

* cited by examiner

*Primary Examiner* — Randy W Gibson
(74) *Attorney, Agent, or Firm* — Sanchelima & Associates, P.A.; Jesus Sanchelima; Christian Sanchelima

(57) ABSTRACT

A portable luggage scale including a housing assembly and a measuring assembly. The housing assembly includes a housing. The housing is removably attached to a suitcase or luggage. The housing has a lid hingedly attached thereto. The measuring assembly includes a weight measuring device and a light emitting diode (LED) display. The weight measuring device measures the weight inside the housing. The LED display is used to visualize the weight measured by the weight measuring device. The LED display and the weight measuring device are powered by a battery.

2 Claims, 2 Drawing Sheets

PORTABLE LUGGAGE SCALE

BACKGROUND OF THE INVENTION

1. Field of the Invention

The present invention relates to a portable luggage scale and, more particularly, to a portable luggage scale that allows weighing the contents deposited in a suitcase.

2. Description of the Related Art

Several designs for luggage scales have been designed in the past. None of them, however, include a portable housing which can be fitted into suitcases to weigh the suitcase.

Applicant believes that a related reference corresponds to U.S. Pat. No. 7,629,542 issued for a suitcase with internal netting connected to tension sensors for weighing contents. Applicant believes that another related reference corresponds to U.S. patent Application No. 2011/0100726 issued for a luggage case accessory for measuring weight of a luggage case. None of these references, however, teach of a portable luggage scale comprising a battery-powered, weight measuring pad with an LED scale display, which is removably insertable into a suitcase or luggage.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a portable luggage scale that includes a light emitting diode (LED) display to visualize the weight in the suitcase.

It is another object of this invention to provide a portable luggage scale that includes a hinged lid to emulate the operating environment of the suitcase.

It is another object of the present invention to provide a portable luggage scale that includes a housing with a sensor to measure the weight inside the housing.

It is still another object of the present invention to provide a portable luggage scale that includes a keypad to introduce additional weight to the measured weight inside the portable luggage scale, said additional weight can be the weight of the suitcase where the portable luggage scale is inserted.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
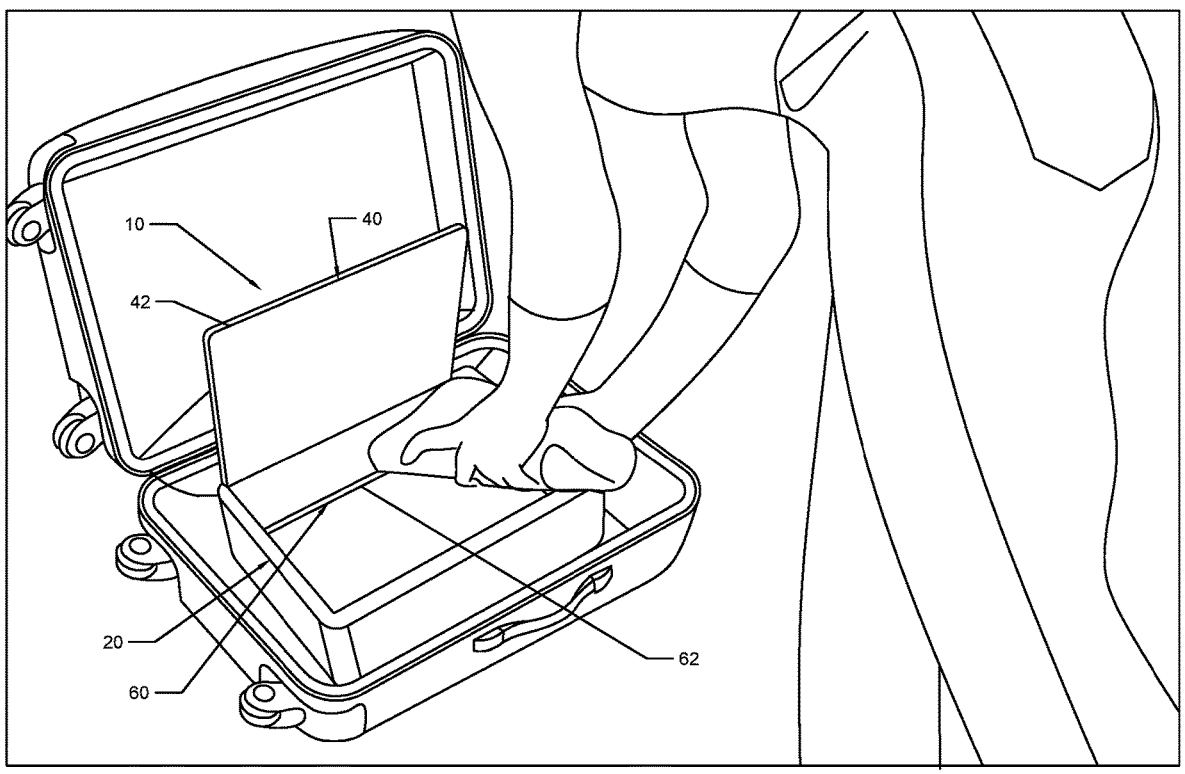
FIG. 1 represents an isometric operational view of the present invention 10.

Referring now to the drawings, where the present invention is generally referred to with numeral 10, it can be observed that it basically includes a housing assembly 20, a lid assembly 40 and a measuring assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The housing assembly 20 may include a housing 22. The housing 22 may have a rectangular shape with rounded corners. It also may be suitable for the housing 22 to have a circular shape, a rectangular shape, or any other suitable shape. The housing 22 may be hollow. The housing 22 may have a rear wall, a front wall, a bottom wall, a right wall, and a left wall. The top wall of the housing 22 may have an opening. The opening of the top wall of the housing 22 may be used to access to the inside of the housing 22. The housing 22 may fit into a suitcase or luggage. The housing 22 may be made of plastic, metal, wood, ceramic, or any other suitable material. The housing 22 may be closed through the lid assembly 40.

Figure 2:
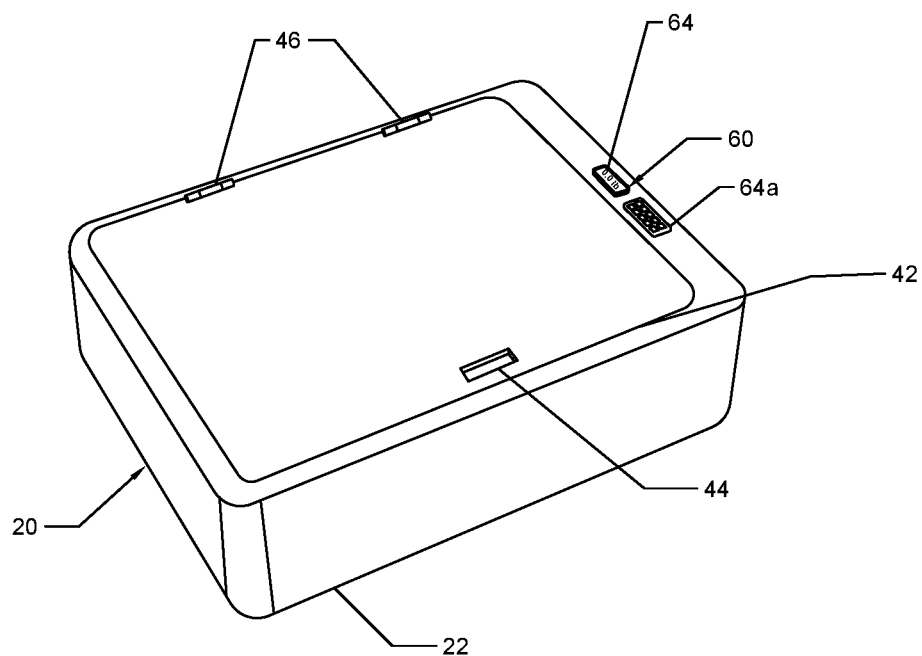
FIG. 2 shows an isometric view of the present invention in a closed configuration 10.

As best illustrated in FIG. 2 the lid assembly 40 may include a lid 42, a handle 44 and pivoting elements 66. The lid 42 may substantially have a rectangular shape. It also may be suitable for the lid 42 to have a triangular shape, a circular shape, or any other suitable shape. The lid 42 may be hingedly attached to one uppermost edge of the left wall, the right wall, the front wall, or the rear wall of the housing 22 through hinges 46.

The hinges 46 may be knife hinges, offset hinges, butt hinges, ball-bearing hinges, or any other suitable hinges known in the prior art. The hinges may be made of plastic, metal, or any other suitable material. The hinges 46 may be used to pivot the lid 42 from an open configuration to a closed configuration. In the closed configuration the lid 42 may be coupled to the opening of the top wall of the housing 22. In the closed configuration the lid 42 may be parallel to the bottom wall of the housing 22. In the closed configuration the lid 42 may close the housing 22. In an open configuration the housing 22 may be open. The handle 44 may be located on the top side of the lid 42. The handle 44 may be used to help in holding the lid 42. The handle 44 may be an indentation in the top wall of the lid 42. It also may be suitable for the handle 44 to be an opening in the top of the lid 42, an added pull handle, twist handle or any handle for holding the lid 42.

Figure 3:
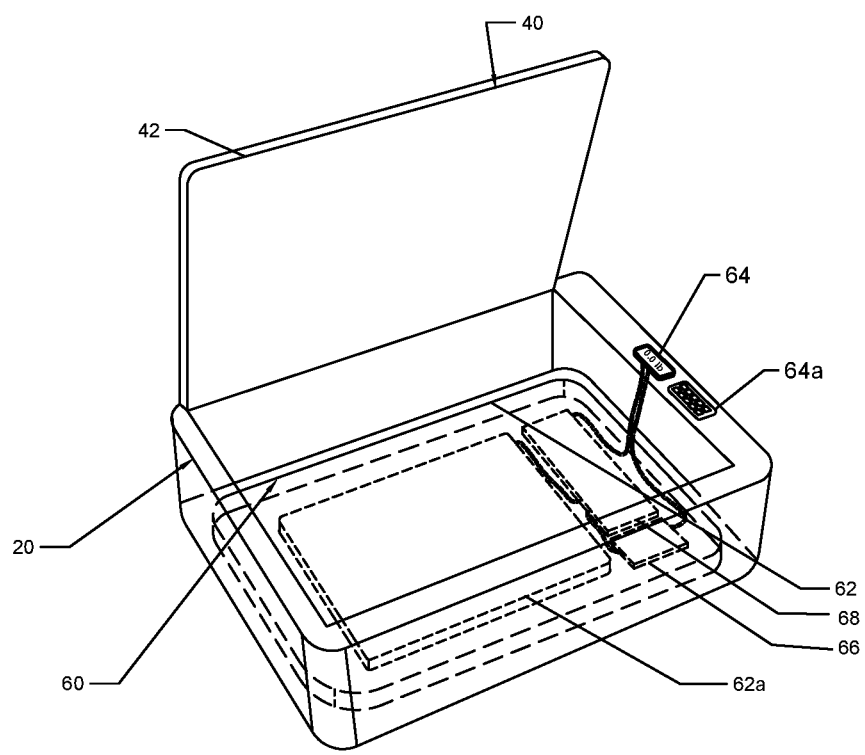
FIG. 3 illustrates a see-through view of the present invention 10 in an open configuration. The present invention 10 includes a housing assembly 20, a lid assembly 40 and a measuring assembly 60.

As illustrated in the FIG. 3 the measuring assembly 60 may include a measuring pad 62, a sensor 62a, a display 64, a keypad 64a, a microcontroller 66 and a battery 68. The measuring pad 62 may be located in the top of the bottom wall of the housing 22. It also may be suitable for the measuring pad 62 to have any other configuration inside the housing 22. The measuring pad 62 may have a rectangular shape. It also may be suitable for the measuring pad 62 to have a circular shape, a triangular shape, or any other suitable shape. The measuring pad 62 may be made of cloth, plastic, or any other suitable material. The measuring pad 62 may be connected to the display 64. The sensor 62*a*, the microcontroller 66 and the battery 68 may be located inside the measuring pad 62.

The sensor 62*a* may be a hydraulic sensor, a pneumatic sensor, a capacitance sensor, or any other suitable sensor for measuring weight. The sensor 62*a* may be used to measure the weight deposited over the measuring pad 62. The sensor 62 may be connected to the microcontroller 66. The microcontroller 66 may process input data from the sensor 62*a*. The microcontroller 66 may transmit the input data to the display 64. The display 64 may display the measure of the weight over the measuring pad 62. The display 64 may be a light emitting diode (LED) sensor. It also may be suitable for the display 64 to be a liquid crystal display (LCD) or any other display. The display 64, the microcontroller 66 and the sensor 62*a* may be powered through the battery 68. In a preferred embodiment the battery 68 may be a rechargeable battery. The battery 68 may be a lithium battery, an alkaline battery, a carbon-zinc battery, or any other battery known in the prior art. The keypad 64*a* may be a numeric keypad. The keypad 64*a* may be used to introduce additional weight to the weight measure inside the housing 22 such as the previously known weight of the suitcase where the housing 22 is introduced. It may be suitable to display the input data of the keypad 64*a* in the display 64.

In a preferred embodiment a user may fit the invention 10 into a suitcase and then introduce goods into the invention 10. The user may visualize the weight of the goods deposited into the invention 10 through the display 64. The user may keep the invention 10 into the suitcase or remove the invention as needed. It may be suitable for the present invention to be tared to include its own weight plus the weight of goods introduced therein. It also may be suitable for the keypad 64*a* to add additional weight such as the weight of the suitcase where the housing 22 is introduced to have the total weight inside the suitcase.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A portable luggage scale, comprising:
 a housing assembly, wherein said housing assembly includes a housing, said housing is hollow, said housing is removably inserted into a suitcase or luggage, said housing has an opening to introduce goods therein;
 a lid assembly, wherein said lid assembly includes a lid and hinges at a lateral side thereof, said lid is hingedly attached to said housing, said lid is configured to open and close said opening; said lid further includes a handle located on a lateral side opposite to said hinges; wherein said handle is an indentation; and
 a measuring assembly, wherein said measuring assembly includes a weight measuring device, a keypad and a display, said weight measuring device includes a measuring pad and a sensor, said sensor is inside said measuring pad, said weight measuring pad is inside said housing forming an internal base for goods to be placed thereon, said sensor measures the weight of said goods placed inside said housing, said display displays said weight, said display and said measuring device are powered by means of a battery, said keypad is capable of be used to add weight to said measured weight; said keypad and said display are located on a lateral portion of the housing adjacent to said lid.

2. A portable luggage scale, consisting of:
 a housing assembly, wherein said housing assembly includes a housing, said housing is hollow, said housing is rectangular with rounded edges and dimensioned to be removably inserted into a suitcase or luggage, said housing has an opening on a top surface to introduce goods therein;
 a lid assembly, wherein said lid assembly includes a lid, a handle, and hinges, said lid is hingedly attached to said housing, said lid opens and closes said opening, said handle is attached to said lid opposite to said hinges, wherein said handle is a rectangular indentation; and
 a measuring assembly, wherein said measuring assembly includes a weight measuring device, a keypad and a display, wherein said display is a light emitting diode (LED) display, said weight measuring device includes a measuring pad, a microcontroller and a sensor, said sensor and said microcontroller are embedded within said measuring pad, said weight measuring pad is inside said housing forming an internal base for goods to be placed thereon, said sensor measures the weight of said goods placed inside said housing, said microcontroller process said measured data from said sensor, said microcontroller transmits said measured data to said display, said display displays said weight, said weight measuring device is capable of be tared to include the weight of said portable luggage scale in the weight displayed in said display, said display, said microcontroller and said measuring device are powered by means of a battery, said keypad is preprogrammed by said microcontroller to manually add weight to said measured weight: said keypad and said display are located on a lateral portion of the housing adjacent to said lid.

\* \* \* \* \*